April 15, 1924.
K. L. HANSEN
1,490,209
ARC WELDING DYNAMO ELECTRIC MACHINE
Filed Sept. 25, 1919
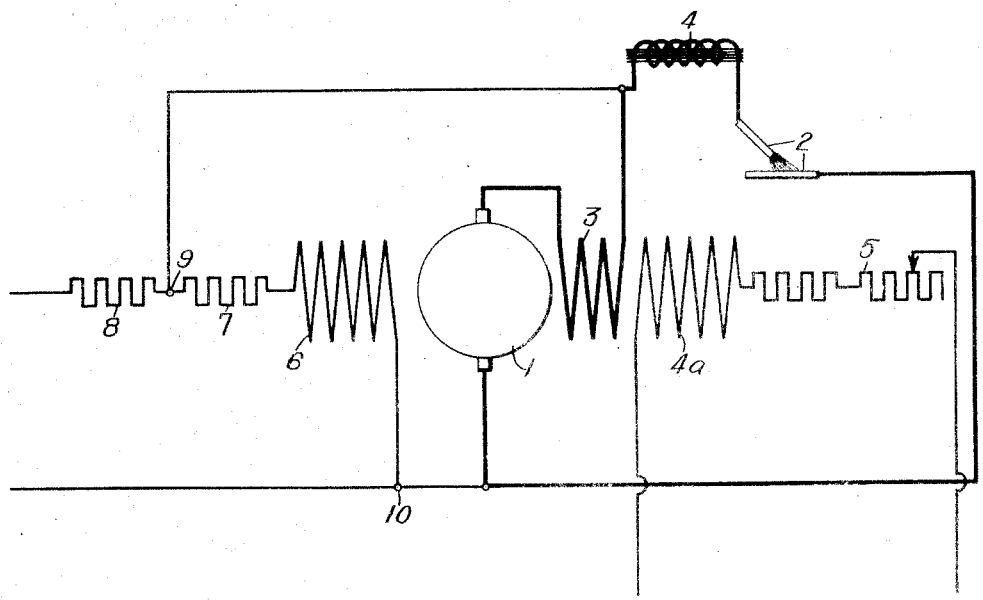
WITNESSES:
J. A. Helsel
O. E. Bee.
INVENTOR
Klaus L. Hansen.
BY
Wesley G. Carr
ATTORNEY Patented Apr. 15, 1924.

1,490,209

UNITED STATES PATENT OFFICE.

KLAUS L. HANSEN, OF WILKINSBURG, PENNSYLVANIA, ASSIGNOR TO WESTINGHOUSE ELECTRIC AND MANUFACTURING COMPANY, A CORPORATION OF PENNSYLVANIA.

ARC-WELDING DYNAMO-ELECTRIC MACHINE.

Application filed September 25, 1919. Serial No. 326,295.

*To all whom it may concern:*

Be it known that I, KLAUS L. HANSEN, a citizen of the United States, and a resident of Wilkinsburg, in the county of Allegheny and State of Pennsylvania, have invented a new and useful Improvement in Arc-Welding Dynamo-Electric Machines, of which the following is a specification.

My invention relates to electric-arc welding systems and, more particularly, to generators of the constant-current type which may be employed in direct-current welding systems. The primary object of my invention is to provide direct-current welding systems in which ease of operation shall be combined with deposit-penetrating qualities to ensure strong and homogeneous welds.

Heretofore, in direct-current welding systems, it has been customary to consider ease of operation to be the paramount object, even though detrimental effects should be experienced in the deposit-penetrating power of the system. For example, welding systems have been built which could be operated by an inexperienced welder but which did not ensure strong welds.

In some cases, a large reactance was employed in the welding circuit to obtain great ease in drawing and maintaining an arc. However, the ease with which an arc may be established and maintained frequently has the effect of causing the deposited metal to be merely laid upon the work instead of causing it to penetrate the work or the parent metal, thereby producing a weld of little mechanical strength. The desire, therefore, to produce a welding system which could be operated by an inexperienced welder defeated the primary object which it was desired to attain because an experienced welder would be required to produce a strong weld.

One object of my invention, therefore, resides in the provision of a welding system in which ease of operation shall be combined with good penetrating qualities so that a relatively inexperienced welder may establish and maintain an arc to produce a strong and homogeneous weld.

A still further object of my invention is to provide a welding system in which the employment of a relatively bulky and heavy reactance may be obviated and, at the same time, to establish conditions under which a relatively inexperienced operator may produce good welds.

With these and other objects in view, my invention will be hereinafter more fully described and is illustrated in the single figure of the drawing which is a diagram of a welding system embodying my invention.

In practicing my invention, I may provide a welding system by employing a direct-current generator having a plurality of field windings which are excited from an independent source of electric current. Another field winding is so connected in series with the generator that its action opposes the action of the first mentioned field windings. The welding circuit may be provided by connecting a plurality of electrodes to the terminals of the generator and, if desired, a reactance may be connected in series with the generator to establish more stable conditions in the welding circuit. One of the field windings, which is connected to the independent source of current, may also be connected in series with a resistor which is connected to the independent source of current, and the terminals of the generator may be connected to the field winding. The last mentioned field winding may be excited, at all times, by the independent source of current or its excitation may be provided by a current which is the sum of a current from the generator and a current from the independent source. The conditions may be controlled by suitable adjustment of the resistor which is connected in series with the field winding and the independent source of current, as will be more fully described hereinafter.

In the drawing is shown a welding system comprising a generator 1 having one of its terminals connected to one of a plurality of electrodes 2 and its other terminal connected, through a field winding 3 and a reactance 4, to the other electrode 2. A field winding 4ª is so connected, through a variable resistor 5, to an independent source of current (not shown) as to oppose the action of the field winding 3. Another field winding 6 is connected, at one side, to a plurality of resistors 7 and 8 and, at its other side, to the independent source of current. The generator 1 also has one of its terminals connected between the resistors 7 and 8, as indicated at 9, and its other terminal is also connected to the field winding 6, as indicated at 10. The field winding 6 is preferably so wound or connected to the independent source of current as to supplement the action of the field winding 4ª in opposition to the action of the field winding 3, the excitation of the field winding 3 being, of course, proportional to the current of the generator 1.

In operating the above described welding system, a suitable value is first determined for the resistor 8 to establish the most desirable conditions in the welding circuit, which may be considered as including the generator 1, the field winding 3, the reactance 4 and the electrodes 2. It will be appreciated, from an inspection of the diagram, that the value of the resistance offered by the resistor 8 to the flow of current from the independent source of current, governs, to a great extent, the value of the excitation of the field winding 6 and, furthermore, determines the source of current which provides the excitation. For example, the potential drop in the resistor 8 may be made of such value that the field winding 6 shall always be excited from the independent source of current or the potential drop may be made of such value that the excitation of the field winding 6 may be provided by a current which is the sum of a current from the independent source and a current from the generator 1.

It will be appreciated that, as the value of the resistance of the resistor 8 is increased, the tendency to provide a self-excited field winding will be increased while, on the other hand, as the value of the resistance of the resistor 8 is decreased, the tendency will be to provide a separately excited field winding. I have found, however, that very satisfactory conditions may be established by such value of resistance in the resistor 8 that the field winding 6 shall be excited by a current from the generator 1 and a current from the independent source of excitation when the welding circuit is open and no welding is being performed and entirely excited by a current from the independent source when a welding operation is being performed.

The independent source of current may comprise a small exciter to be driven by the same motor which drives the generator 1. The value of the magnetomotive force established by the action of the field windings 4ª and 6 is always greater in magnitude than the magnetomotive force established by the field winding 3. When it is desired to weld, the field windings 4ª and 6 are connected to the independent source of current and the electrodes are engaged preliminarily to establishing an arc. The electrodes are then slowly separated, in the usual manner, to establish an arc, and the increased resistance in the welding circuit, resulting from the increased voltage drop across the arc, tends to divert more current through the field winding 6 and, therefore, to provide a stronger magnetomotive force in the generator 1 against the action of the field winding 3. It will be appreciated, therefore, that, as the length of the arc varies, causing the resistance in the welding circuit to vary, the magnetomotive force established in the generator 1 varies to provide a constant working current in the welding circuit.

Although I have shown a reactance employed in the welding circuit, it need not be employed, but it tends to create more stable conditions in the welding circuit even if only a small reactance is utilized. It is an advantage, therefore, to employ a small reactance because it does not materially increase the weight of the system or its cost of installation. The resistor 7 may also be omitted, if desired, but I have found that it is an advantage, in some instances, because of its effect in the variation in the values of the excitation of the field winding 6.

The resistor 8 may be made in the form of a variable resistor, if so desired, but I have found that, after determining a suitable value of resistance for the resistor 8, a distinct advantage is obtained if the value is fixed because it decreases the amount of possible adjustments that may be made in the complete welding system, which ensures that the best conditions shall always obtain. The above described welding system possesses the advantageous features of simplicity, relatively low cost and portability.

Although I have shown and specifically described a welding system which embodies my invention, it is obvious that minor changes may be made in the disposition of the elements comprising the system or that the generator, embodied in the system, may be employed in other systems where a constant-current type of generator is desirable. I desire, therefore, that no limitations shall be imposed except such as are indicated in the appended claims.

I claim as my invention:

1. In an exciting system for generators, the combination with three exciting field windings, of an independent source of electric current connected to excite two of the field windings in opposition to the other and means for increasing the excitation of one of the field windings connected to the independent source of current in proportion to an increase in resistance against the flow of current from the generator.

2. In an exciting system for generators, the combination with three exciting field windings, of an independent source of electric current connected to excite two of the field windings in opposition to the other and means for causing electric current from the generator to supplement the excitation provided by the independent source of current for one of the field windings connected thereto.

3. In an exciting system for generators, the combination with three exciting field windings, of an independent source of electric current connected to excite two of the field windings in opposition to the other and a plurality of resistors connected in series with one of the field windings and the independent source of current and a connection between said resistors and the generator.

4. In an arc welding system comprising a plurality of electrodes, a generator connected thereto, an independent source of electric current and means for establishing a magnetomotive force in the generator which is the algebraic sum of a magnetomotive force proportional to the current of the generator and an opposing magnetomotive force which is the sum of a plurality of magnetomotive forces produced by the independent source of current, one of said forces being in the generator circuit.

5. In an arc welding system comprising a plurality of electrodes, a generator connected thereto, a reactance connected in series with the generator, an independent source of electric current and means for establishing a magnetomotive force in the generator which is the algebraic sum of a magnetomotive force proportional to the current of the generator and an opposing magnetomotive force which is the sum of a plurality of magnetomotive forces produced by the independent source of current, one of said forces being in the genereator circuit.

6. In an arc welding system comprising a plurality of electrodes, a generator connected thereto, an independent source of electric current, a field winding connected in series with the generator and a plurality of field windings so connected to the independent source of current as to oppose the action of the first winding, one of said windings being in the generator circuit.

7. In an arc welding system comprising a plurality of electrodes, a generator connected thereto, an independent source of electric current, a field winding connected in series with the generator, a plurality of field windings so connected to the independent source of current as to oppose the action of the first winding and a resistor connected in series with the independent source of current and one of the field windings connected thereto.

8. In an arc welding system comprising a plurality of electrodes, a generator connected thereto, a reactance connected in series with the generator, an independent source of electric current, a field winding connected in series with the generator and a plurality of field windings so connected to the independent source of current as to oppose the action of the first winding, one of said windings being in the generator circuit.

9. In an arc welding system comprising a plurality of electrodes, a generator connected thereto, a field winding connected in series with the generator, a field winding so connected to the independent source of current and the generator as to oppose the action of the first winding, a resistor connected in series with the independent source of current and the field winding connected thereto and another field winding so connected to the independent source of current as to supplement the action of the other field winding connected thereto.

In testimony whereof, I have hereunto subscribed my name this 20th day of Sept., 1919.

KLAUS L. HANSEN.